«12» United States Patent
Zellner

(10) Patent No.: US 10,178,220 B2
(45) Date of Patent: *Jan. 8, 2019

(54) MODE CHANGING OF A MOBILE COMMUNICATION DEVICE AND VEHICLE SETTINGS WHEN THE MOBILE COMMUNICATIONS DEVICE IS IN PROXIMITY TO A VEHICLE

(71) Applicant: Prosper Technology, LLC, Dover, DE (US)

(72) Inventor: Samuel Zellner, Dunwoody, GA (US)

(73) Assignee: Prosper Technology, LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,937

(22) Filed: May 22, 2017

(65) Prior Publication Data

US 2017/0257478 A1    Sep. 7, 2017

Related U.S. Application Data

(60) Continuation of application No. 14/930,987, filed on Nov. 3, 2015, now Pat. No. 9,661,125, which is a (Continued)

(51) Int. Cl.
*H04W 4/80* (2018.01)
*H04M 1/725* (2006.01)
(Continued)

(52) U.S. Cl.
CPC ........ *H04M 1/72563* (2013.01); *H04L 67/12* (2013.01); *H04M 1/6075* (2013.01); *H04W 4/80* (2018.02); *H04M 2250/02* (2013.01)

(58) Field of Classification Search
CPC . H04L 67/12; H04M 1/6075; H04M 1/72563; H04M 2250/02; H04W 4/008
See application file for complete search history.

(56) References Cited

U.S. PATENT DOCUMENTS 6,330,508 B1   12/2001   Akabori et al.
6,624,758 B1    9/2003   Omata et al.
(Continued)

OTHER PUBLICATIONS

Jeep Grand Cherokee WJ—UConnect Hands-free communication system. http:/ web.archive .org/web/20021221 082322; http://www.wjjeeps.com/ucon nect.htm, Dec. 21, 2002 (print Jul. 20, 2005).

*Primary Examiner* — Timothy Pham
(74) *Attorney, Agent, or Firm* — FisherBroyles LLP

(57) ABSTRACT

A driver of a vehicle is identified and a command is sent to a mobile communications device that is associated with the identified driver and that is in proximity of the vehicle to force the mobile communications device to change modes such as to enter a hands-free or other suitable mode. The driver may be identified through one or more techniques including biometric sensing, key detection, switch controls, and so forth. Additionally, the driver and/or feature settings preferred by the current driver may be identified by receiving data from the mobile communications device. The data may identify the driver ID with preferred feature settings, the mobile communications device which has an association to a driver ID with preferred feature settings, or the data may specify the preferred feature settings.

19 Claims, 10 Drawing Sheets

Related U.S. Application Data continuation of application No. 13/082,095, filed on Apr. 7, 2011, now Pat. No. 9,219,811, which is a division of application No. 11/539,560, filed on Oct. 6, 2006, now Pat. No. 7,937,075.

(51) Int. Cl.
*H04M 1/60* (2006.01)
*H04L 29/08* (2006.01)

(56) References Cited

U.S. PATENT DOCUMENTS

| | | |
|---|---|---|
| 6,690,956 B2 | 2/2004 | Chua et al. |
| 7,937,075 B2 | 5/2011 | Zellner |
| 7,957,773 B2 | 6/2011 | Chua et al. |
| 8,244,307 B1 | 8/2012 | Tilgner et al. |
| 2002/0197976 A1 | 12/2002 | Liu et al. |
| 2003/0032460 A1 | 2/2003 | Cannon et al. |
| 2003/0080850 A1 | 5/2003 | Kline |
| 2003/0139173 A1 | 7/2003 | Mazzara et al. |
| 2004/0185842 A1 | 9/2004 | Spaur et al. |
| 2004/0203554 A1 | 10/2004 | Simon |
| 2004/0242198 A1 | 12/2004 | Oyagi et al. |
| 2006/0052141 A1 | 3/2006 | Suzuki |
| 2006/0211446 A1 | 9/2006 | Wittmann et al. |
| 2006/0262103 A1 | 11/2006 | Hu et al. |
| 2007/0032952 A1 | 2/2007 | Carlstedt et al. |
| 2007/0042812 A1 | 2/2007 | Basir |
| 2007/0082706 A1 | 4/2007 | Campbell et al. |
| 2007/0120948 A1 | 5/2007 | Fujioka et al. |
| 2007/0224980 A1 | 9/2007 | Wakefield |
| 2007/0238491 A1 | 10/2007 | He |
| 2008/0122595 A1 | 5/2008 | Yamamichi et al. |
| 2008/0252412 A1 | 10/2008 | Larsson et al. |
| 2009/0163140 A1 | 6/2009 | Packham et al. |

| DRIVER ID | PHONE ID |
|---|---|
| 999 | 123/234 |
| 888 | 234 |
| 000 | 567 |
| ⋮ | ⋮ |

FIG. 3

MODE CHANGING OF A MOBILE COMMUNICATION DEVICE AND VEHICLE SETTINGS WHEN THE MOBILE COMMUNICATIONS DEVICE IS IN PROXIMITY TO A VEHICLE

CROSS-REFERENCE TO RELATED APPLICATION

This application is a continuation of U.S. patent application Ser. No. 14/930,987, filed Nov. 3, 2015, which is a continuation of U.S. patent application Ser. No. 13/082,095, filed Apr. 7, 2011, and issued Dec. 22, 2015 as U.S. Pat. No. 9,219,811, which is a divisional application of U.S. patent application Ser. No. 11/539,560, filed Oct. 6, 2006, and issued May 3, 2011, as U.S. Pat. No. 7,937,075. The contents of each of the above-referenced applications and patents are incorporated by reference herein in their entirety.

TECHNICAL FIELD

The technology relates to changing of modes of mobile communications devices or altering vehicle settings when the mobile communication device is in proximity of the vehicle.

BACKGROUND

Mobile communications devices, such as mobile phones and mobile phone equipped data devices have become ubiquitous. For many, the mobile communications device is a vital tool for their daily lives. Mobile communications devices enable users to place and receive calls without restriction on the user's own mobility. However, users place and receive calls during situations where the call is a hindrance, particularly when driving a vehicle. When driving a vehicle, the user must manipulate the controls of the vehicle while also handling and manipulating the controls of the mobile communications device.

To address the problem of the user being required to simultaneously handle both the manual aspects of driving a vehicle and the manual aspects of using a mobile communications device to place and receive calls, hands-free functionality has been developed. The hands-free functionality allows the user to put the mobile communications device into a hands-free mode so that the user can place and receive calls without having to manually deal with the mobile communications device. The user is free to manipulate the controls of the vehicle without interference from the mobile communications device. The hands-free functionality may be exclusively included in the phone, such as speaker phone mode, may be a cradle based system that provides a physical connection of the mobile communications device to systems that allow for hands-free functions, or may be a wireless connection such as a BLUETOOTH® connection.

While the hands-free mode of operation is helpful to a driver of a vehicle, in most cases the driver must choose that the hands-free mode become active. While some users may devotedly make such a choice, others may not. Even when the hands-free mode is an option, some users may not use it when they drive. Lack of use may be because they forget or because they simply disregard the feature. Thus, the safety and convenience benefits of hands-free mode are lost in those cases.

Furthermore, in some cases the hands-free mode may be configured between a hands-free system and multiple mobile communications devices present in a vehicle. The mobile communications device of the passenger may enter hands free mode while the mobile communications device of the driver remains in the normal, hands-required mode. Thus, the hands-free mode that is available in that situation is not being used to satisfy the ultimate need of allowing the driver to focus on driving the vehicle.

Additionally, vehicles have many features that may have various settings. For example, the position of the seat, the steering wheel, the pedals and so forth may be adjusted to suit the driver. For some vehicles, these settings may be set and later recalled so that the driver is not required to adjust the settings when another driver has previously used the vehicle. However, the driver must remember to activate the proper feature settings unless the vehicle has the ability to detect the driver by using a key fob or a biometric method.

SUMMARY

Exemplary embodiments provide mode changes of mobile communication devices based on identifying the driver and nearby mobile communication devices. Associations of drivers to mobile communication devices are maintained and when a driver and a matching mobile communication device are identified, a command is sent to the matching mobile communication device to force it to change a mode. For example, the mobile communication device may be forced to enter a hands-free mode so that the driver is able to benefit from the hands-free mode of the mobile communication device being used by the driver. Additionally or alternatively, the mobile communications device may provide data that either identifies the driver so that the preferred feature settings may be applied or provides an indication of the preferred features such as by providing a device identifier to which feature settings have been associated.

One embodiment is a system for changing of modes of mobile communication devices in a vehicle. The system includes a driver identification module that obtains an identification of a driver of the vehicle. The system further includes a communication system that communicates with the mobile communication device when the mobile communication device comes into close proximity with the communication system, wherein the communication system obtains an identification of the mobile communication device. The system includes storage that maintains an association of an identification of potential drivers to an identification of mobile telephones. Additionally, the system includes a processor that receives the identification of the driver and the identification of the mobile communication device. The processor determines from storage whether the identification of the mobile communication device is associated with the identification of the driver. When the identification of the mobile communication device is associated with the identification of the driver, then the processor sends a command via the communication system to the mobile communication device to force the mobile communication device to change a mode.

Another embodiment is a computer readable medium having instructions for providing change of modes of a mobile communication device in a vehicle. The instructions perform acts including receiving an identification of a driver of the vehicle, receiving an identification of the mobile communications device in close proximity to the vehicle, and determining whether a set of associations between identifications of potential drivers to mobile communications devices includes an association between the received identification of the driver and the received identification of the mobile communications device. When the received identification of the mobile communication device is associated with the received identification of the driver, then a command is sent to the mobile communication device to force the mobile communication device to change a mode.

Another embodiment is a method of forcing a mobile communications device to change modes. The method involves detecting an identity of a driver of a vehicle, detecting an identity of a mobile communication device in close proximity to the vehicle, and determining whether the identity of the driver is associated with the identity of the mobile communication device. When the identity of the driver is associated with the identity of the mobile communication device, then a command is sent to the mobile communication device to force the mobile communication device to change a mode.

BRIEF DESCRIPTION OF THE DRAWINGS

FIG. 3 shows an exemplary embodiment of a table that maintains associations of identifiers of drivers to identifiers of mobile communications devices.

DETAILED DESCRIPTION OF ILLUSTRATIVE EMBODIMENTS

Exemplary embodiments activate various modes of a mobile communications device that is associated with the driver of the vehicle by identifying both the current driver and those mobile communications devices that are in proximity. A command to activate a particular mode is sent to the mobile communications device of the driver. Accordingly, it is the driver that benefits from a particular mode, such as hands-free mode, without further intervention by the driver or other passenger of the vehicle.

Figure 1:
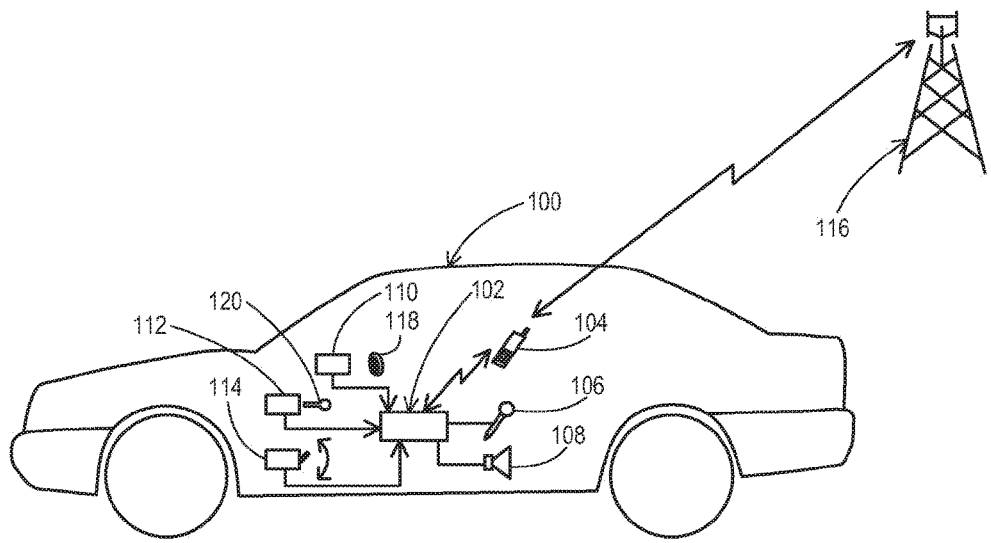
FIG. 1 shows a vehicle including exemplary embodiments of systems for detecting the identity of a driver and sending a mode changing command to the mobile communications device of the driver.

FIG. 1 shows an example of a vehicle 100 and systems for identifying the driver and the mobile communications device as well as for sending the mode changing command. The systems for identifying the driver may be existing systems of a vehicle that are used for configuring features of the vehicle depending upon the driver. For example, the seat position, steering wheel position, pedal position, climate control settings, and/or radio pre-sets of vehicles may be automatically controlled by identifying the driver.

These systems use a driver identification sensor such as a biometric sensor 110. Examples of a biometric sensor include sensor for a fingerprint 118 or retinal scanner, a weight or height measurement for the individual in the driver's seat, and the like. The biometrics of one driver differ from those of the next so that the identity of the current driver can be determined. The sensor is positioned so as to capture the biometric information of the driver as opposed to other occupants. In this example, once the sensor has determined the biometric information of the driver, the sensor 110 then provides data representing the identity of the driver to a controller 102. It will be appreciated that the sensor module 110 and controller 102 may be integrated rather than being separate components as shown.

Another example of a driver identification sensor is a key recognition module 112, such as in the ignition switch, which receives a key 120 that is inserted by the driver to open the door or to start the vehicle 100. In this scenario, keys 120 are distinguishable and one key is assigned to one driver while another key is assigned to a different driver. Thus, the module 112 recognizes which key is inserted and thereby recognizes the identity of the driver. The module may then provide data representing the identity of the driver to the controller 102. As noted above, the recognition module 112 may be integrated with the controller 120 rather than being a separate component as shown.

Another example of a driver identification sensor is a switch 114. This switch 114 may be a touch-button panel that allows the driver to touch the button assigned to that driver. Thus, when the current driver touches the button in order to configure the features of the vehicle, such as seat position, steering wheel tilt, etc., the switch 114 is made aware of the identity of the driver. The switch 114 may then provide data representing the identity of the driver to the controller 102.

The controller 102 may also maintain communication with a mobile communication device brought in proximity of the controller 102. For example, the mobile communication device 104 may broadcast its identity, or may be receptive to queries for its identity, via wireless radio frequency communication. Examples of such wireless radio frequency communication include BLUETOOTH® communication, Wi-Fi communication, and the like. Alternatively, the wireless phone may be physically connected to the controller such as via a cradle. For example, see the various manners of communicatively coupling the mobile communications device to the controller as discussed in commonly assigned U.S. Pat. No. 6,690,956 and U.S. patent application Ser. No. 10/725,579, both of which are incorporated herein by reference.

The controller 102 obtains the identity of the mobile communications device 104, such as the electronic serial number, mobile identification number, and the like, via the communication with the mobile communications device 104. The controller 102 may then exercise logic to determine whether to send a mode changing command to a particular mobile communications device 104 that happens to be in proximity based on whether or not that mobile communications device 104 is associated with the current driver that has been identified.

Upon activation of a particular mode as a result of the mobile communications device 104 receiving and acting upon the command, additional features may become active, such as an external microphone 106 and speaker 108 that provides better hands-free performance than the microphone and speaker of the mobile communications device 104. When calls are placed to or received from a mobile communications system 116 via the mobile communications device 104 that has changed to a more suitable mode such as a hands-free mode, the driver is then relieved of having to manipulate and otherwise handle the mobile communications device 104 thereby allowing the driver to focus on controlling the vehicle 100.

Figure 2:
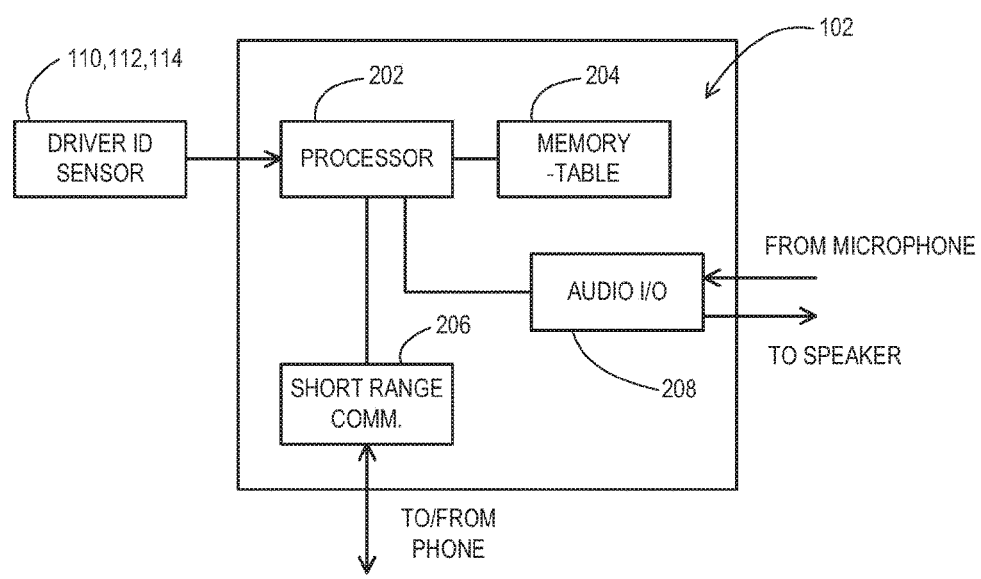
FIG. 2 shows an exemplary embodiment of a system for detecting the identity of the driver and sending the mode changing command to the corresponding mobile communications device.

FIG. 2 shows one exemplary embodiment of the controller 102 in conjunction with various peripherals. The controller 102 of this example includes a processor 202, such as a general purpose programmable processor or a dedicated purpose processor, hard-wired digital logic, and the like. The processor 202 communicates over an external data bus with memory 204, or memory 204 may be integral to the processor 202. The memory 204 stores a table of associations such as that shown in FIG. 3 that the processor 202 may reference when determining whether and where to send a mode changing command. The memory 204 may also store operational instructions or programming that the processor 204 may access and implement to perform the logical operations such as those discussed below in relation to FIG. 4. Alternatively, the processor 202 may be hard-wired or otherwise programmed to perform those logical operations.

The processor 202 and the memory 204 are example of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 202 obtains the identity of the current driver by receiving data from a driver ID sensor, such as the module 110, 112, and 114 discussed above in relation to FIG. 1. The driver ID sensor generates data that distinguishes one individual from another. For example, the fingerprint module 110 may recognize one fingerprint as being that associated with a driver ID number, and that driver ID number is then output to the processor 202.

The processor 202 obtains the identity of the mobile communications devices that are in proximity to it by using a communications connection 206. This communications connection 206 may be of various forms. For example, this connection may be a physical cradle within which mobile communications devices are placed inside the vehicle, such as to charge the batteries of the mobile communications device or to otherwise secure the mobile communications device within the vehicle 100. Alternatively, the communications connection 206 may be a limited range wireless communication system, such as a Bluetooth® or Wi-Fi system that has the ability to detect the presence of a mobile communications device, either by listening for mobile communications devices to broadcast their presence and/or identity or by polling for mobile communications devices by sending a query during a polling period or at a specified time such as a few seconds after a door of the vehicle 100 is closed.

The communications connection 206 may send and receive information necessary to implement the mode changing command and subsequent mode of operation. The identity of the mobile communications device 104 may be received and provided to the processor 202, such as an electronic serial number of mobile identification number. The processor 202, upon finding that a particular mobile communication device is associated with the current driver, then sends the mode changing command back to the mobile communications device via the communications connection 206. For example, the processor 202 may generate a Bluetooth® hands-free command based on a profile stored for each of the mobile communications devices 104 that are associated to a driver via the table 204.

Upon the mobile communications device 104 receiving and acknowledging the mode changing command, then the communications connection 206 may be used to carry the bi-directional audio data of a telephone call where the mobile communications device relies on the audio input/output 208 of the controller 102 upon entering a hands-free mode. In that case, the audio input/output 208 captures audio, via microphone 106, that is sent by the mobile communications device 104 and produces audio, via speaker 108, that has been received by the mobile communications device 104. If the mobile communications device 104 has its own hands-free audio abilities, then those may be used instead such that the audio capabilities of the controller 102 are not used or are omitted from the controller 102 altogether. Furthermore, the communications connection may also be used to carry more advanced data such as commands spoken by the driver when in a voice-only or similar mode, commands entered in a built-in screen of the vehicle or the controller 102 when in a video or control re-direct mode, and so forth in order to provide control of the mobile communications device 104 if such advanced features are not already being provided by a feature of the mobile communications device 104.

FIG. 3 shows an example of a data table 300 stored in memory 204. The data table 300 associates driver IDs of column 302 with mobile communication device IDs of column 304. In this example, it can be seen that driver ID 999 is associated with a first mobile communication device identified as 123 and second mobile communication device identified as 234. It will be appreciated that the actual identifier string may have any number and type of characters than those shown, and that the data of table 300 is merely for illustrative purposes. In this example, it can also be seen that driver 888 is associated with mobile communication device identified as 234. Thus, whenever the driver is 999, then if both devices 123 and 234 are detected, then the command may either be sent to both of them to ensure that the driver's phone is in the suitable mode or may be sent to only 123. If sent to only 123, then it is presumed that driver 888 is also present in the vehicle with device 234 such that 234 need not be in the changed mode. If driver 888 had also been associated with phone 123, then both devices 123 and 234 may be instructed to enter the new mode to ensure that which ever phone is in use by the current driver is in that new mode. In this example driver 000 is associated with device 567 so if the current driver is 000, then neither device 123 nor device 234 is instructed to enter a new mode if they are present within the vehicle.

Figure 4A:
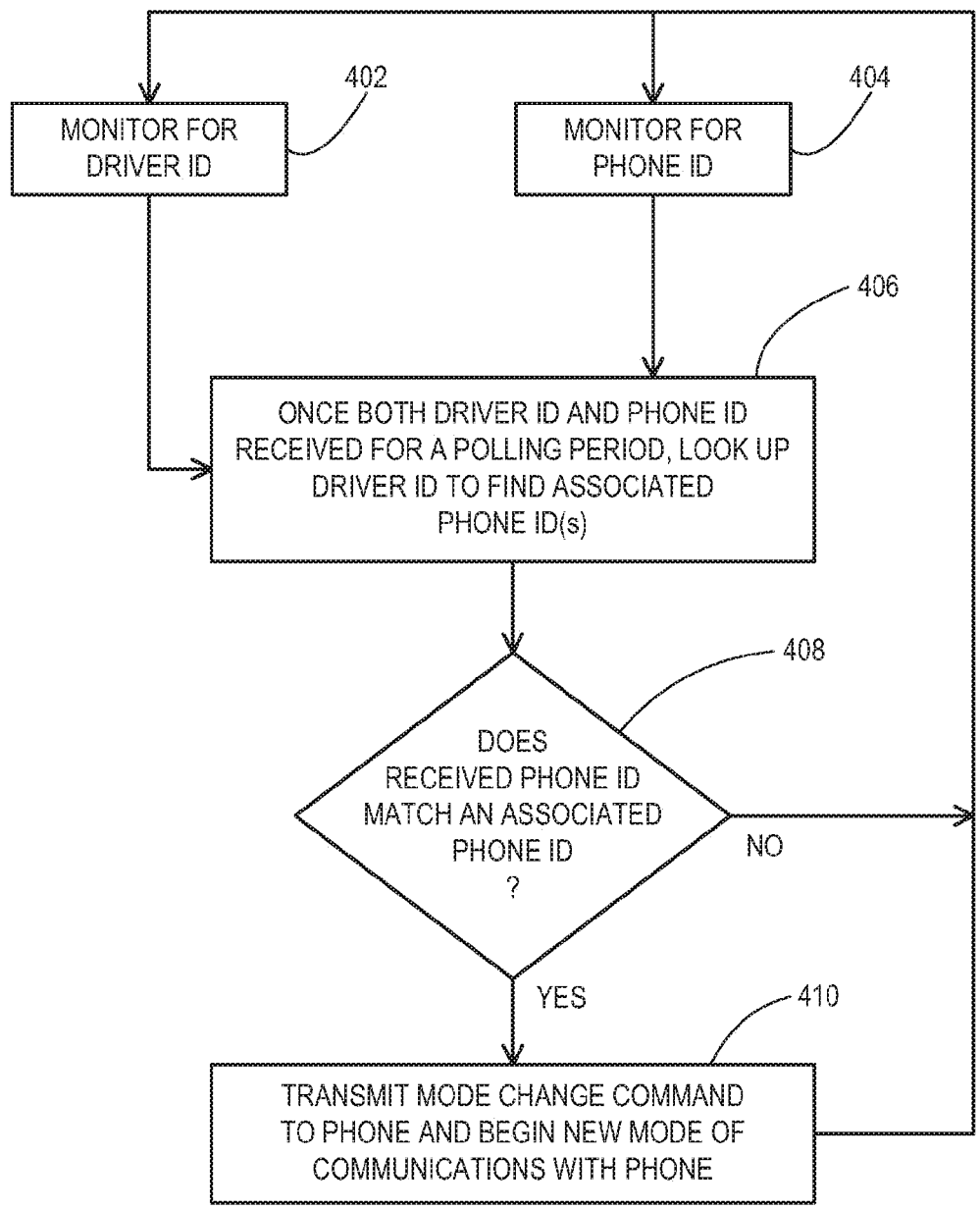
FIG. 4A shows an exemplary embodiment of logical operations performed to send a mode changing command to a mobile communication device associated with the driver.

FIG. 4A shows a set of logical operations implemented by the processor 202 to provide the changed mode activation based on the driver. Initially, the processor 202 monitors for a driver ID at driver operation 402. Here, the processor 202 receives as input the driver ID value generated by the driver ID sensor. Contemporaneously, the processor 202 monitors for a mobile communications device ID at device operation 404, either by detecting a broadcast or by submitting queries at certain times or at polling intervals.

Once both a driver ID and at least one mobile device ID are received, the processor 202 performs a look-up of one of the IDs to see if it matches the other at look-up operation 406. Once the set of device IDs associated to the driver ID for the current driver have been found, then query operation 408 detects whether there is a match. If not, then operational flow returns to driver ID and phone ID operations 402, 404 to continue monitoring for a different driver ID and/or different phone ID.

The operational flow continues to poll for different driver IDs and/or different phone IDs in this exemplary embodiment in order to account for a change in drivers and to account for communication devices being introduced after the initial polling. For example, the driver may change without the ignition switch of the vehicle 100 ever being turned off so continuing to poll or otherwise listen for a driver ID permits detection of the new driver. Likewise, a communication device 104 may be introduced into the vehicle at some time after the initial polling period, such as by physically bringing the device 104 into the vehicle 100 or powering on the device 104 at some later time. Therefore, continuing to poll or otherwise listen for a new device ID permits detection of the new communication device.

For instances where query operation 408 detects a match between the driver ID and a device ID, the processor 202 transmits a changed mode command to the mobile communication device at command operation 410. Here, the mobile communications device 104 receives and acknowledges the command and enters the new mode. Where the mobile communications device 104 receives a request to enter a mode where the mobile communications device 104 relies upon audio input/output abilities and/or the user input abilities of the controller 102, then the new mode results in communications begin being exchanged between the mobile communications device 104 and the controller 102 to place and receive calls. As indicated above, according to an exemplary embodiment, operational flow returns to driver and phone operations 402, 404 to continue determining who the current driver is and which communications devices are in proximity.

Figure 4B:
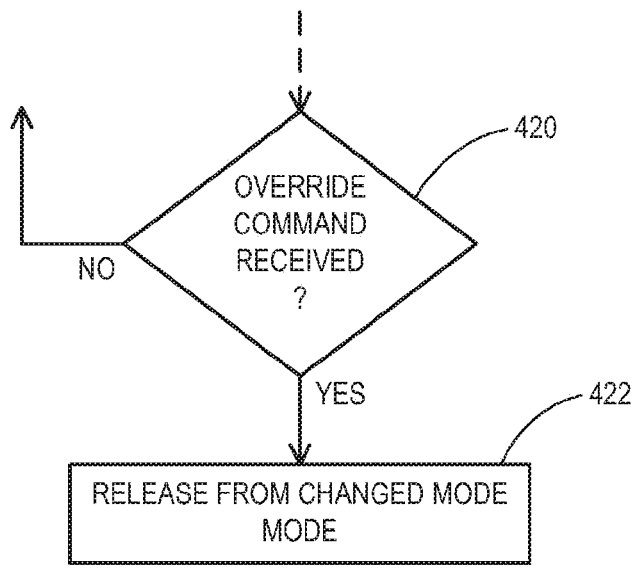
FIG. 4B shows an exemplary embodiment of logical operations performed to override the mode change.

An exemplary embodiment shown in FIG. 4B provides the driver or other vehicle occupant with the ability to override the mode change. At query operation 420, the processor 202 detects whether an override selection has been made by the user. For example, an override option may be provided on the mobile communications device 104 itself or on the vehicle 100 such as within the system 102. If no override option has been received thus far, the processor 202 maintains the status quo. If the override option has been received, then a release from the changed mode occurs at release operation 422. In one or more embodiments the processor 202 may generate a command to release the mobile communications device 104 from the changed mode so that it may return to the previous mode or enter whatever mode the driver chooses. According to one or more embodiments, if the override is entered directly on the device 104, then the device 104 may directly respond without intervention by the processor 202 by exiting the changed mode of operation.

Figure 4C:
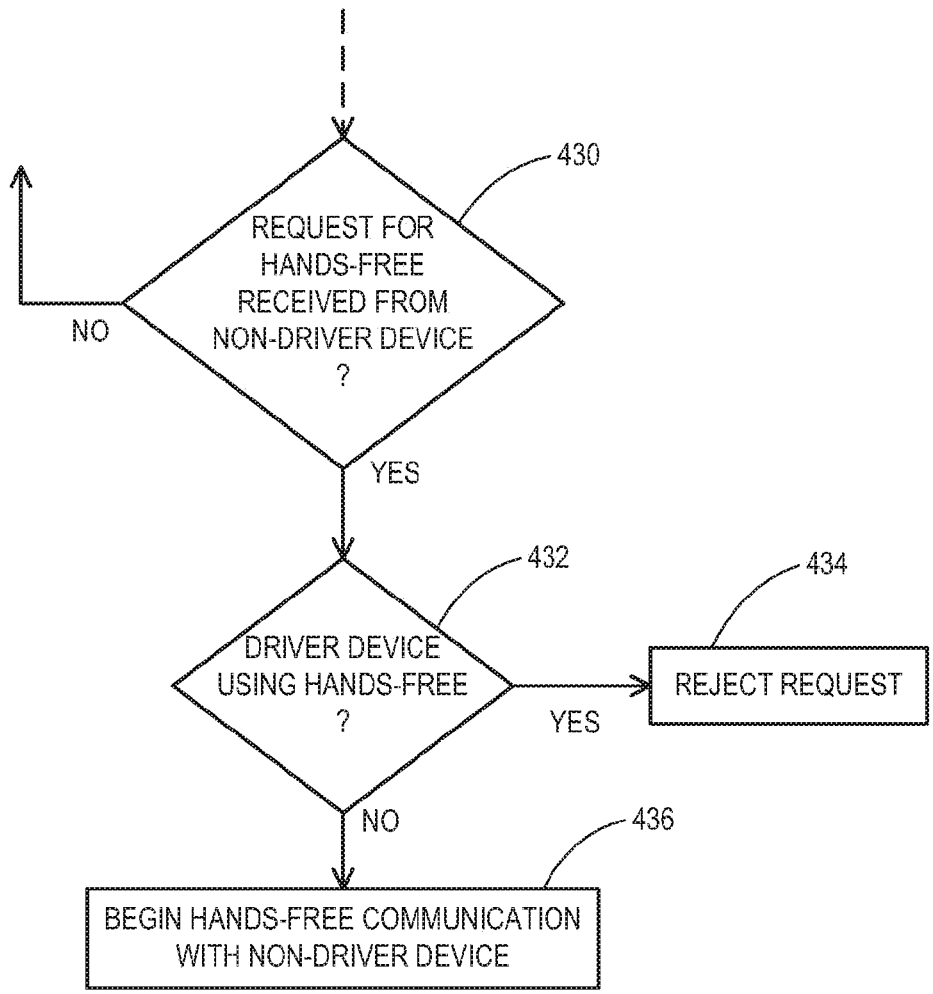
FIG. 4C shows an exemplary embodiment of logical operations performed to allow non-driver mobile devices to utilize hands-free equipment of a vehicle.

Another exemplary embodiment is shown in FIG. 4C where the vehicle 100 includes a system 102 that provides for hands-free components that may be used when the device 104 enters a hands-free mode. In this embodiment, it may be desirable for other mobile communications devices within the vehicle, such as those of the passengers, to utilize the hands-free components. At query operation 430, the processor 202 detects whether a hands-free request from a non-driver device has been received. If not, then the processor 202 maintains the status quo. If such a request is received, then query operation 432 detects whether the driver device 104 is currently utilizing the hands-free components of the vehicle. If so, then the request is rejected 434 to prevent conflicts from arising due to both the driver device 104 and any other device attempting to use the hands-free components. If the driver device 104 is not utilizing hands-free, then the processor 202 begins hands-free mode communications with the requesting non-driver device at communication operation 436.

Figure 4D:
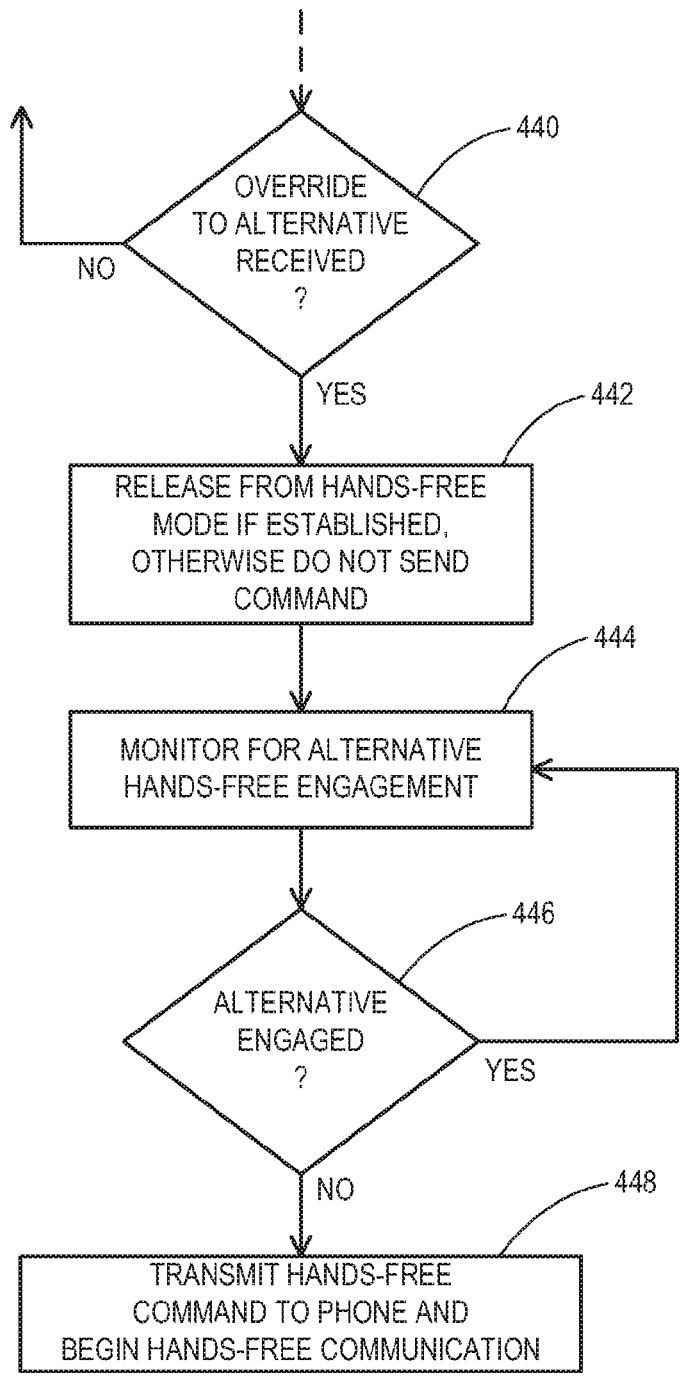
FIG. 4D shows an exemplary embodiment of logical operations performed to override the mode change of hands-free and monitor for use of an alternative.

Another exemplary embodiment is shown in FIG. 4D which allows the driver or other vehicle occupant with the ability to exit a hands-free mode that utilizes hands-free components of the vehicle in favor of utilizing an alternative hands-free mode. For example, the mobile communication device 104 may have an adequate built-in hands-free set of components which the driver prefers to the hands-free components of the vehicle. Furthermore, other occupants of the vehicle may have mobile communications devices that would benefit from making use of the hands-free components of the vehicle 100, and allowing the mobile communication device 104 of the driver to be released from the hands-free components of the vehicle allows the other devices to utilize those hands-free components. Thus, the operations of FIG. 4D may work in conjunction with those of FIG. 4C so that query operation 432 of FIG. 4C may recognize that the driver device 104 is no longer employing the hands-free components of the vehicle 100.

At query operation 440, the processor 202 detects whether an override-to-alternate selection has been made by the user. For example, an override option may be provided on the mobile communications device 104 itself or on the vehicle 100 such as within the system 102 to allow an alternate hands-free mode to be entered where the hands-free components of the vehicle are not chosen. If no override option has been received thus far, the processor 202 maintains the status quo. If the override option has been received, then a release from the changed mode occurs at release operation 442. In one or more embodiments the processor 202 may generate a command to release the mobile communications device 104 from the changed mode so that it may return to the previous mode or enter whatever mode the driver chooses. According to one or more embodiments, if the override is entered directly on the device 104, then the device 104 may directly respond without intervention by the processor 202 by exiting the changed mode of operation. At this point, the processor 202 may begin monitoring for alternative hands-free operation of the mobile communications device 104 of the driver at monitor operation 444. Query operation 446 then detects whether such alternate hands-free operation is occurring and if so, then continues to monitor the device 104. If query operation 446 detects that the device 104 is not engaged in an alternative hands-free mode of operation, then the processor 202 again transmits the hands-free command to the device 104 to begin hands-free communication with it.

Returning to FIG. 4A, as discussed above, there may be instances where the current driver may be associated with multiple device IDs that are present within the vehicle 100. In that situation, both device IDs are found at look-up operation 406. Then, query operation detects that both device IDs do match the current driver ID. In one exemplary embodiment, the command operation 410 may send the changed mode command to both devices associated with the current driver ID without regard to other considerations.

Figure 4E:
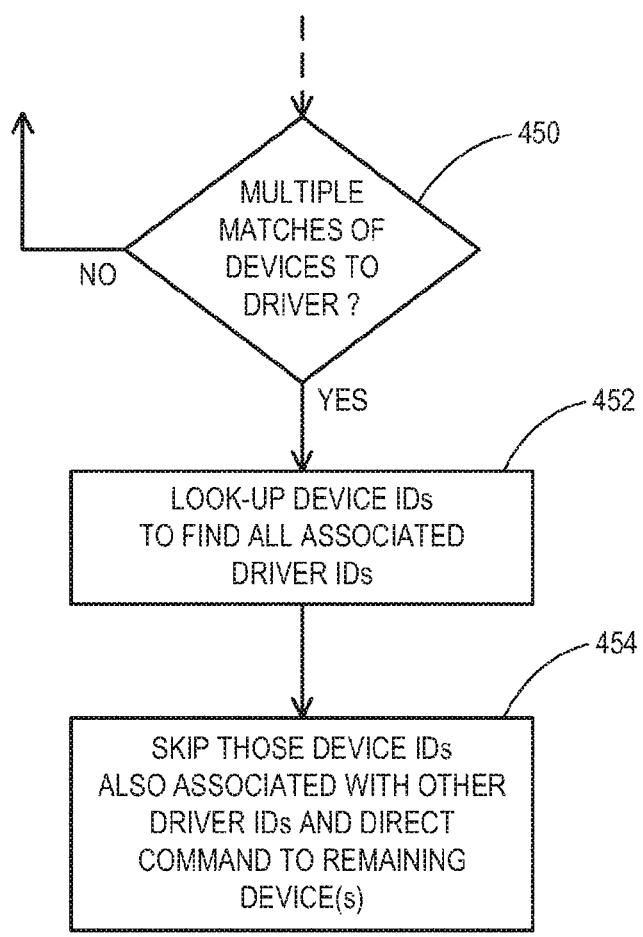
FIG. 4E shows an exemplary embodiment of logical operations performed to avoid mode change of devices not in use by the driver.

In another exemplary embodiment as shown in FIG. 4E, upon detecting multiple device ID matches to the current driver ID at query operation 450, as a substitution for query operation 408, look-up operation 452 is performed to determine if any one of the device IDs also corresponds to any other potential drivers who are not the current driver. For each of the device IDs for which another potential driver is also associated with the device ID of interest, then the command to that device ID may be skipped at command operation 454.

Figure 4F:
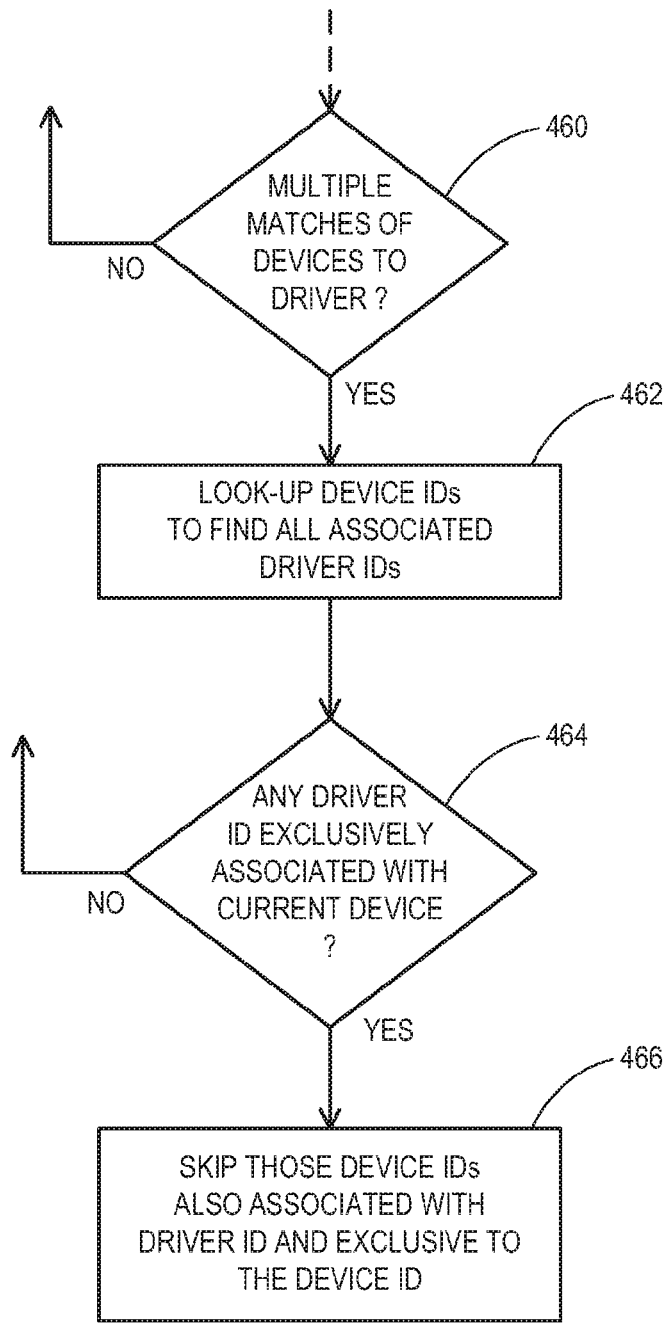
FIG. 4F shows another exemplary embodiment of logical operations performed to avoid mode change of device not in use by the driver.

In another exemplary embodiment as shown in FIG. 4F, upon detecting multiple device ID matches to the current driver ID at query operation 450, as a substitution for query operation 408, look-up operation 462 determines if any one of the device IDs also corresponds to any other potential drivers who are not the current driver. Query operation 464 then detects whether any of those other potential drivers are associated exclusively to this device ID of interest and therefore, not associated to the other device IDs that have been discovered and that are associated with the current driver. For each of these device IDs for which another potential driver is exclusively associated with this device ID of interest, then the command to this device ID may be skipped at command operation 466.

Figure 4G:
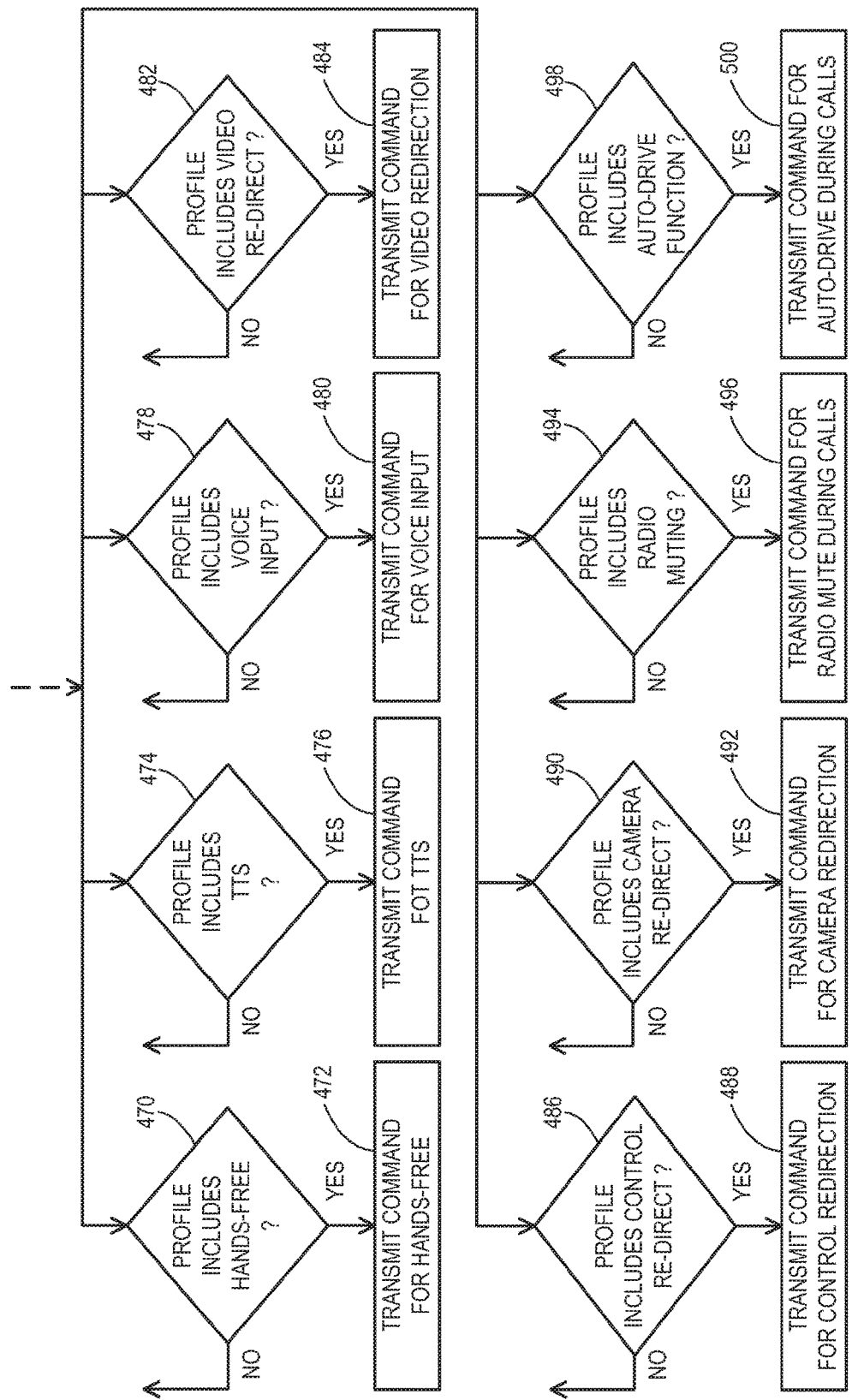
FIG. 4G shows an exemplary embodiment of logical operations performed to initiate one or more mode changes of the mobile communications device and/or related vehicle system.

FIG. 4G shows exemplary logical operations that correspond to sub-operations for command operation 410 of FIG. 4A which allow modes involving specific device 104 and vehicle 100 features to be activated by transmitting command(s). Upon query operation 408 of FIG. 4A determining that the phone ID matches the driver ID, then a series of queries and related commands may be performed such as the examples shown in FIG. 4G.

As a first example, query operation 470 may detect whether a profile that is associated with either the driver ID, phone ID, or both includes a hands-free mode entry. If not, then no hands-free command is transmitted and the system waits on another phone ID/driver ID match to occur. If there is a hands-free mode entry for the profile, then a command is transmitted at command operation 472 to instruct the device 104 to enter a hands-free mode, such as one that implicates hands-free components of the vehicle 100 or one that implicates hands-free features of the device itself or other peripherals.

As another example that may be separate from or performed in conjunction with the preceding example, query operation 474 detects whether the profile includes a text-to-speech (TTS) mode entry. If not, then no TTS command is transmitted and the system waits on another phone ID/driver ID match to occur. If there is a TTS mode entry for the profile, then a command is transmitted at command operation 476 to instruct the device 104 to enter a TTS mode. The TTS mode may allow the device 104 to output as audio any text that it receives so that text messages, emails, and the like are provided audibly for the driver rather than requiring the driver to look at a display.

As another example that may be separate from or performed in conjunction with the preceding examples, query operation 478 detects whether the profile includes a voice input mode entry. If not, then no voice input command is transmitted and the system waits on another phone ID/driver ID match to occur. If there is a voice input mode entry for the profile, then a command is transmitted at command operation 480 to instruct the device 104 to enter a voice input mode The voice input mode may allow the device 104 to receive verbal commands from the driver rather than requiring the driver to manually press keys on the device 104.

As another example that may be separate from or performed in conjunction with the preceding examples, query operation 482 detects whether the profile includes a video redirection mode entry. If not, then no video redirection command is transmitted and the system waits on another phone ID/driver ID match to occur. If there is a video redirection mode entry for the profile, then a command is transmitted at command operation 484 to instruct the device 104 to enter a video redirection mode. The video redirection mode may allow the device 104 to output to an external display system such as a display of the vehicle 100 the data representative of any display the device 104 is producing. Thus, the driver may view the screen of the vehicle 100 which may be in a more suitable location, such as on a dashboard or heads-up display so that driver does not need to look at the device 104 which may be in a less suitable location.

As another example that may be separate from or performed in conjunction with the preceding examples, query operation 486 detects whether the profile includes a control redirection mode entry. If not, then no control redirection command is transmitted and the system waits on another phone ID/driver ID match to occur. If there is a control redirection mode entry for the profile, then a command is transmitted at command operation 488 to instruct the device 104 to enter a control redirection mode. The control redirection mode may allow the device 104 to receive control signals generated by external systems, such as a virtual keypad on a dashboard display to that the driver is not required to manually press keys on the device 104.

As another example that may be separate from or performed in conjunction with the preceding examples, query operation 490 detects whether the profile includes a camera redirection mode entry. If not, then no camera redirection command is transmitted and the system waits on another phone ID/driver ID match to occur. If there is a camera redirection mode entry for the profile, then a command is transmitted at command operation 492 to instruct the device 104 to enter a camera redirection mode. The camera redirection mode may allow the device 104 to redirect its camera output to an external system such as a video display system of the vehicle 100 such as in a car visor or dashboard display. In this manner, the device 104 may be placed in many locations and provide visual feedback to the driver, such as placing the device 104 with the camera portion aimed rearward to provide a video display of the area behind the vehicle.

Thus, exemplary embodiments disclosed herein provide for forcing mobile communications devices to change mode if the current driver of the vehicle 100 is expected to be using the detected mobile communications device 104. Drivers need not manually change the mode of the communications device 104 that they are carrying with them into the vehicle 100 such that forgetfulness or disinterest of the driver does not prevent the use of the appropriate mode by the driver.

As one example of a mode change requested of systems of the vehicle 100 that may be separate from or performed in conjunction with the preceding examples, query operation 494 detects whether the profile includes a radio muting mode entry. If not, then no radio muting command is transmitted during calls and the system waits on another phone ID/driver ID match to occur. If there is a radio muting mode entry for the profile, then a command is transmitted at command operation 496 to instruct the radio of vehicle 100 to enter a muted mode while calls are being conducted using the device 104. Muting the radio provides the advantage of less ambient sound being collected during conversation, whether hands-free or otherwise. The command may be transmitted by the system 102 of the vehicle 100 upon the system detecting an incoming or outgoing call involving device 104 by maintaining status communications with the device 104. Alternatively, the radio muting mode may result in the device 104 generating a radio muting signal during calls where that signal is received and acted upon by the system 102 to trigger the radio muting.

As another example that involves responsiveness of systems of the vehicle 100 that may be separate from or performed in conjunction with the preceding examples, query operation 498 detects whether the profile includes an auto-drive mode entry. If not, then no auto-drive command is transmitted during calls and the system waits on another phone ID/driver ID match to occur. If there is an auto-drive mode entry for the profile, then a command is transmitted at command operation 500 to instruct the auto-drive system of vehicle 100 to enter an active mode while calls are being conducted using the device 104. Such auto-drive functions may include cruise control, automatic vehicle-to-vehicle spacing, automatic headlight activation, automatic wiper activation, and the like.

A system such as the example shown in FIG. 1 may also perform similar tasks besides transmitting commands to the mobile communication device 104 regarding mode changes. For instance, a system 102 may utilize the device ID and the table of FIG. 3 to identify the driver based on the presence of the device 104 rather than through other manners of driver identification. The identity of the driver is presumed based on the presence of the associated device 104. Then, features of the vehicle 100 that are specific to the driver but potentially unrelated to operation of the mobile device 104 may be activated, configured, etc. in accordance with the driver. For example, the seat position, steering wheel tilt, mirror position, and so forth may automatically adjust to suit the driver by recognizing that the mobile device 104 associated with the driver has entered the vehicle 100.

Figure 5:
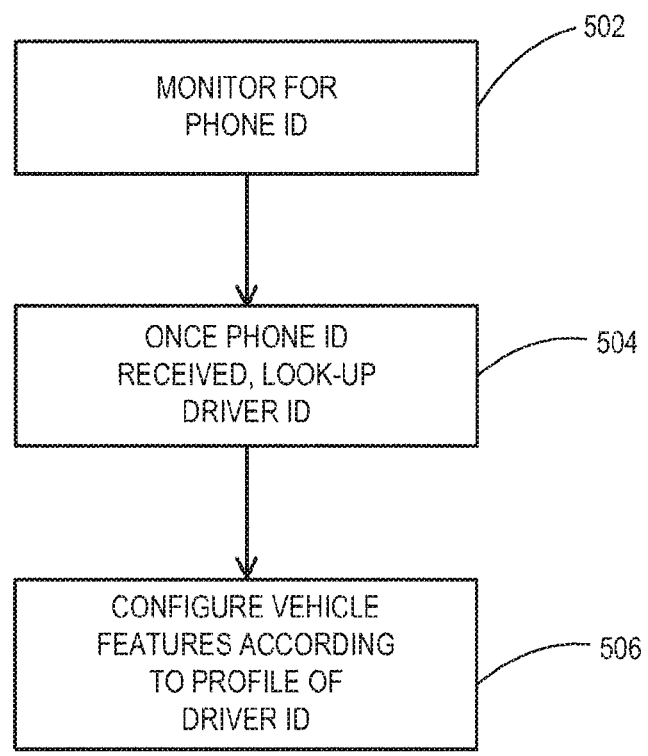
FIG. 5 shows an exemplary embodiment of logical operations performed to configure a vehicle feature in response to identifying the driver from the presence of an associated mobile communication device.

FIG. 5 shows exemplary logical operations for such vehicle feature control based on driver identification from the mobile device 104. At monitor operation 502, the processor 202 monitors for the presence and ID of a mobile device 104. Once the mobile device 104 comes in proximity of the vehicle, the processor 202 looks-up the ID received from the mobile device 104 at look-up operation 504 to find the associated driver ID. Then, the processor 202 may set the features as stored for the current driver ID at configuration operation 506 for embodiments where the processor 202 has control of such vehicle settings. For embodiments where the processor 202 does not have such access and control, then the processor 202 may submit the driver ID to a vehicle processor having such authority.

Furthermore, in the various embodiments above where the mobile communications device 104 and/or the systems of the vehicle 100 are able to change modes, the driver ID may be omitted altogether whereby the device ID is directly associated with mode changes and vehicle configurations. For example, upon the system 102 detecting that a device 104 having a particular device ID is present, the system 102 may look-up the device ID to directly determine what mode to request and/or what vehicle configurations to establish.

Figures 6, 7:
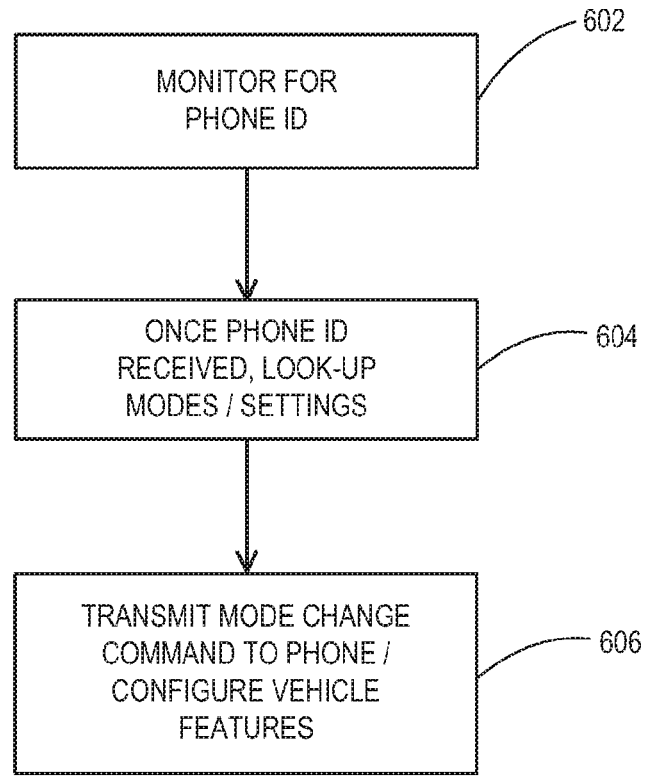
FIG. 6 shows an exemplary set of logical operations.
FIG. 7 shows an exemplary table associating device IDs to modes/configurations.

FIG. 6 shows an exemplary set of logical operations and FIG. 7 shows an exemplary table 700 associating device IDs to modes/configurations.

At monitor operation 602, the processor 202 monitors for the presence and ID of a mobile device 104. Once the mobile device 104 comes in proximity to the vehicle 100, the processor 202 looks-up the ID received form the mobile device 104 at look-up operation 604 to find the associated modes and/or vehicle configurations. Then, the processor 202 may request that the device 104 change its mode as specified in the table 700 of FIG. 7 and/or may initiate the vehicle settings as specified in the table 700 at configuration operation 606.

Additionally, in some embodiments the mobile communication device 104 may have the capability to provide data to the system 102 rather than having the system 102 perform a look-up in a table. Thus, the mobile communication device 104 may be able to provide the user ID such that the processor 202 may utilize this user ID as the driver ID as in look-up operation 504. Thus, configuration operation 506 may be performed on the basis of the user ID provided from the device 104 rather than requiring the look-up in a table. Likewise, the mobile communication device 104 may be able to provide mode and vehicle settings data to the system 102 such that the processor 202 may utilize this mode and settings data as otherwise being looked-up in look-up operation 604. Thus, configuration operation 606 may be performed on the basis of the mode and/or vehicle settings data provided from the device 104 rather than requiring the look-up table.

While various embodiments have been particularly shown and described, it will be understood by those skilled in the art that various other changes in the form and details may be made therein without departing from the spirit and scope of the invention.

What is claimed:

1. A system comprising:
   a first mobile device; and
   a second mobile device coupled to a vehicular system, the vehicular system comprising:
      a processor; and
      a memory coupled with the processor, the memory comprising executable instructions that when executed by the processor cause the processor to effectuate operations comprising:
         receiving an indication that the first mobile device is associated with a first driver of a vehicle associated with the vehicular system when the first mobile device comes into proximity with the vehicular system;
         determining that the second mobile device is associated with the first driver of the vehicle;
         based on the indication received from the first mobile device, instructing the vehicular system to cause the first mobile device and the second mobile device to enter a mode;
         detecting an override from the first mobile device; and
         responsive to detecting the override, instructing the vehicular system to release the second mobile device from the mode.

2. The system of claim 1, wherein the second mobile device is associated with a second driver of the vehicle, wherein the second driver of the vehicle comprises the current driver of the vehicle.

3. The system of claim 1, wherein the operations further comprise, based on the indication received from the first mobile device, instructing the vehicular system to configure a feature of the vehicle.

4. The system of claim 3, wherein the feature comprises a climate control feature or a radio feature.

5. The system of claim 1, wherein the second mobile device is coupled with the vehicular system via a cradle connection.

6. The system of claim 1, wherein the operations further comprise maintaining an association of identifications of a plurality of mobile devices to features of the vehicle.

7. The system of claim 1, wherein the mode comprises one of a control redirection mode, a video redirection mode, a camera redirection mode, or a text-to-speech (TTS) mode.

8. The system of claim 1, wherein the mode comprises a hands-free mode.

9. The system of claim 8, wherein the vehicular system further comprises a hands-free component and the operations further comprise instructing the vehicular system to permit the first mobile device to communicate with the hands-free component.

10. The system of claim 9, wherein the vehicular system comprises a plurality of hands-free components.

11. A non-transitory computer readable storage medium comprising computer executable instructions that when executed by a computing device cause said computing device to effectuate operations comprising:
   receiving an indication that a first mobile device is associated with a first driver of a vehicle associated with a vehicular system when the first mobile comes into proximity with the vehicular system;
   determining that a second mobile device is associated with the first driver of the vehicle, wherein the second mobile device is coupled with the vehicular system;
   based on the indication received from the first mobile device, instructing the vehicular system to cause the first mobile device and the second mobile device to enter a mode;
   detecting an override from the first mobile device; and
   responsive to detecting the override, instructing the vehicular system to release the second mobile device from the mode.

12. The non-transitory computer readable storage medium of claim 11, wherein the mode comprises one of a hands-free mode, a text-to-speech (TTS) mode, a control redirection mode, a camera redirection mode, or a video redirection mode.

13. The non-transitory computer readable storage medium of claim 11, wherein the operations further comprise maintaining an association of identifications of a plurality of mobile devices to features of the vehicle.

14. The non-transitory computer readable storage medium of claim 11, wherein the second mobile device is associated with the current driver of the vehicle.

15. The non-transitory computer readable storage medium of claim 11, wherein the operations further comprise, based on the indication received from the first mobile device, instructing the vehicular system to configure a feature of the vehicle.

16. A method comprising:
   communicatively connecting with a first mobile device when the first mobile device comes into close proximity with a vehicular system of the vehicle;
   receiving from the first mobile device information comprising an indication of a first driver associated with the first mobile device;
   determining that a second mobile device is associated with the first driver of the vehicle, wherein the second mobile device is coupled with the vehicular system;
   based on the information received from the first mobile device, instructing the vehicular system to cause the first mobile device and the second mobile device to enter a mode;
   detecting an override to the mode change from the first mobile device; and
   responsive to detecting the override, instructing the vehicular system to release the second mobile device from the mode.

17. The method of claim 16, wherein the second mobile device is associated with a second driver of the vehicle, wherein the second driver of the vehicle comprises the current driver of the vehicle.

18. The method of claim 16, further comprising maintaining an association of identifications of mobile devices to features of the vehicle.

19. The method of claim 16, wherein the mode comprises one of a hands-free mode, a text-to-speech (TTS) mode, a control redirection mode, or a video redirection mode.

* * * * *